United States Patent

[11] 3,631,243

[72] Inventors William H. Byler
Landing, N.J.;
Halsey L. Raffman, Brooklyn, N.Y.; Frank
Masi, Morristown, N.J.
[21] Appl. No. 14,024
[22] Filed Feb. 25, 1970
[45] Patented Dec. 28, 1971
[73] Assignee United States Radium Corporation

[54] X-RAY FILM MARKING MEANS INCLUDING A FLUORESCENT TONGUE OVERLAYED WITH OPAQUE INDICIA
5 Claims, 8 Drawing Figs.

[52] U.S. Cl. .................................................. 250/67, 250/71 R
[51] Int. Cl. .................................................. H05g 1/28
[50] Field of Search ........................................... 250/67, 71 R

[56] References Cited
UNITED STATES PATENTS

| | | | |
|---|---|---|---|
| 831,591 | 9/1906 | Aylsworth | 250/71 R |
| 1,375,814 | 4/1921 | Bethke | 250/71 R |
| 1,375,815 | 4/1921 | Bethke | 250/71 R |
| 2,156,018 | 4/1939 | Humphner | 250/71 R |
| 2,505,562 | 4/1950 | Meschan | 250/67 |
| 2,630,534 | 3/1953 | Heinecke | 250/67 |
| 3,488,753 | 1/1970 | Tone | 250/67 |

*Primary Examiner*—James W. Lawrence
*Assistant Examiner*—C. E. Church
*Attorney*—Pennie, Edmonds, Morton, Taylor and Adams ABSTRACT: For purposes of identifying particular film exposures in an X-ray cassette or other cameralike housing, a phosphorescent insertion unit activated by incident radiation is provided and indicia are located on a light-emitting surface thereof. The unit is then inserted through a light-sealed aperture in the housing so that its diminishing afterglow casts the silhouette of the indicia on the film adjacent the particular area of exposure to be identified. When the image of the indicia is thereby imprinted on the film, the unit is withdrawn from the housing through the aperture.

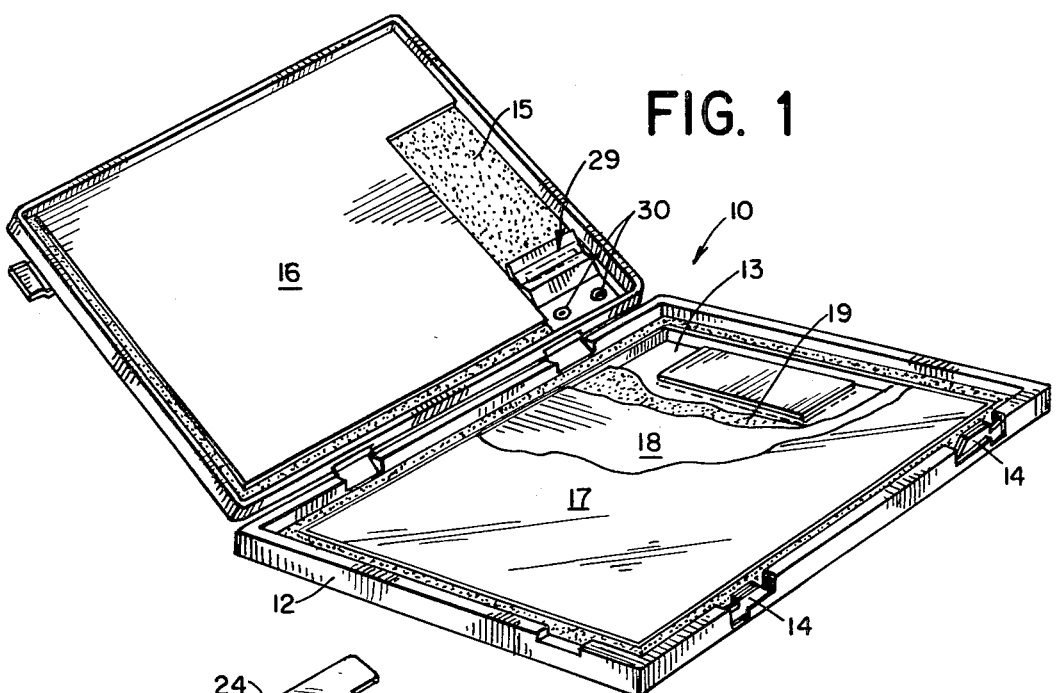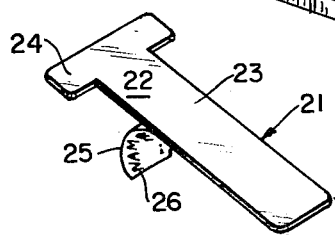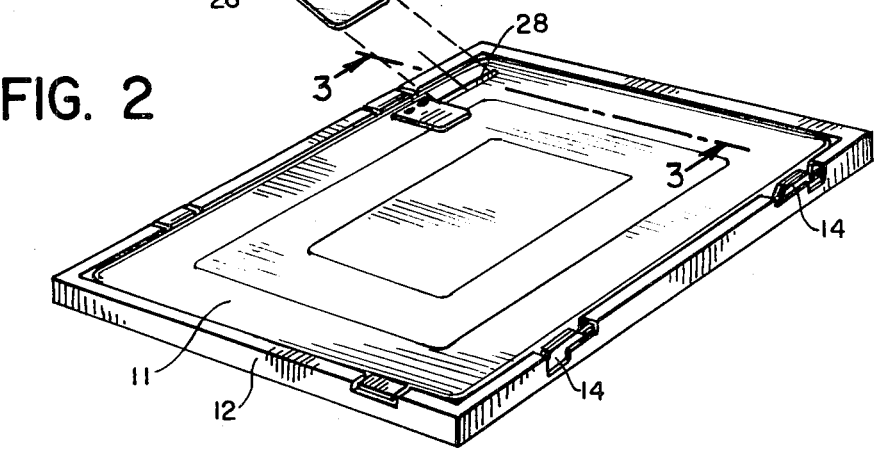

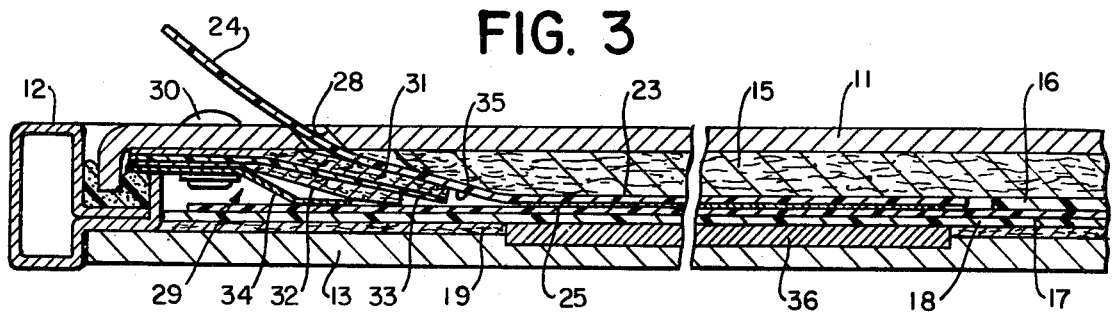
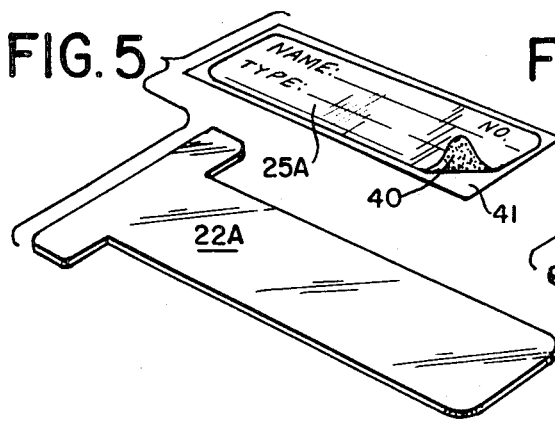
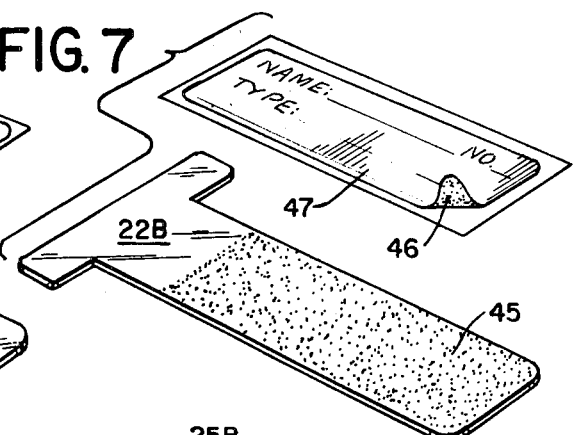
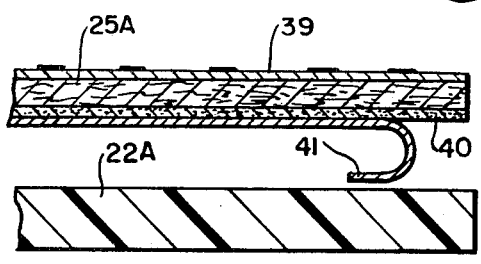
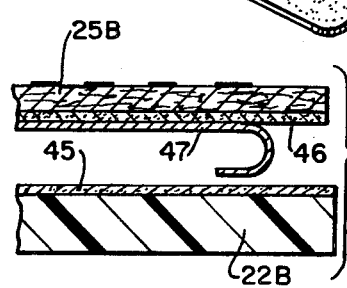
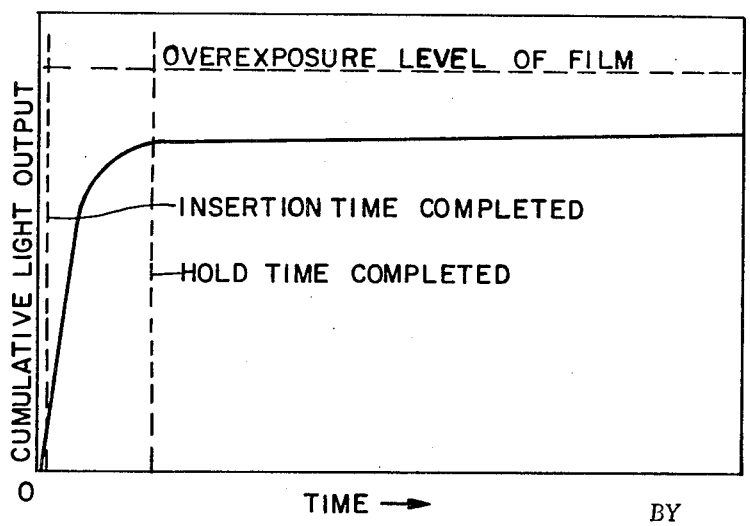
INVENTORS
WILLIAM H. BYLER
HALSEY L. RAFFMAN
FRANK MASI
ATTORNEYS 3,631,243

X-RAY FILM MARKING MEANS INCLUDING A FLUORESCENT TONGUE OVERLAYED WITH OPAQUE INDICIA

BACKGROUND OF THE INVENTION

This invention relates to devices for marking on photographic film certain characters or indicia which identify the exposures. More particularly, it relates to a method and means for identifying film in an X-ray cassette or other film-containing housing which involves insertion into and withdrawal from the housing of a unit bearing not only the identifying indicia but also a phosphorescent source of light to produce an exposure of the indicia on the film.

While the concept of this invention is applicable to a wide range of photographic processes, it is of special benefit in the field of X-ray photography. A reliable, economical and simple procedure has long been sought for insuring that a patient's identification and other relevant data are legibly marked on each X-ray film, particularly in large hospitals where hundreds of exposures are made daily. One of the major requirements of such a procedure is that the data ought to be recorded on the film by the radiologist at the time the X-ray is taken and not subsequently when the film is being developed, so as to avoid delays and interim handling which may result in incorrect marking of the film. Another necessary feature is that the method used to record the data be one which will produce a legible entry on the film every time and not occasionally illegible over or under exposures. The result of such failures is that the patient must be returned for repeat X-rays.

One of the simplest known techniques of X-ray film identification is to place lead type (identifying letters or numbers) on the marginal portion of the cassette in the path of the X-rays, so that their silhouette is impressed on the film along with the subject under diagnosis. As a method for an active radiology department it is by no means satisfactory because it demands undue time and attention to manipulate the type into the correct pattern, and the quantity of data which can be recorded is limited.

Another known practice is to type the data on an index card, clip the card to the corresponding cassette after the X-rays have been taken, and transfer the data from the card to the film photographically during the course of the subsequent development process. While this procedure relieves the radiologist of effort, it is known to result inevitably in instances of confusion where cards become associated with the wrong films during the various stages of handling.

In another approach to the problem, a card bearing the typed information is inserted into the cassette through a light-sealed slot therein just prior to the taking of the X-rays. The light emitted by the intensifying screens in the cassette during the X-ray process is then relied upon to illuminate the data on the card and expose the image of it on the film, just as the screens impart to the film the image of the subject under diagnosis. The principal difficulty with this method is that the intensity of X-rays is varied in accordance with the anatomical subject matter and not infrequently higher intensities result in overexposure of the film in the area where it is to be printed with the data from the card.

SUMMARY OF THE INVENTION

All of these shortcomings of conventional film identification techniques are satisfactorily overcome by the present invention. The essential characteristics of the invention which distinguish it from the prior art are derived from the concept of using a data-bearing card which provides it own phosphorescent-light source to print the image of the data on the film.

In broad terms the invention is applicable to any photographic process wherein exposures are made on film within a housing formed with a light-sealed aperture. The invention provides a method of recording data on the film to identify particular exposures. First an insertion unit of phosphorescent material is exposed to incident radiation so that it emits light. A light-emitting surface of the unit is then overlaid with indicia and inserted into the housing through the light-sealed aperture into a position such that afterglow from the unit casts the silhouette of the indicia on an unexposed area of the film. The unit is then held in that position to expose the film by the afterglow. Finally, the unit is withdrawn from the housing through the aperture to leave the image of the indicia legibly recorded on the film.

The overall means employed for carrying out this method is also the subject of the invention. The means, applicable to photographic apparatus in the broad sense wherein exposures are made on film within a housing, comprises a light-sealed aperture formed in the housing to provide access to an unexposed area of the film therewithin. An insertion unit configured to fit through the aperture is provided with A label is provided in the unit, and means are located on the label defining portion of phosphorescent material defining a light-emitting surface, (b) indicia means on the light-emitting surface, and (c) securing means for affixing the indicia means and the light-emitting surface with respect to one another and to the remainder of the insertion unit. Guiding means are included in the housing for positioning the unit when inserted through the aperture such that afterglow from the phosphorescent material casts the silhouette of the indicia on the unexposed area of the film. Means are also provided for withdrawing the unit from the housing through the aperture to leave the image of the indicia legibly impressed on the film.

A separate aspect of the invention is a film identification unit itself, for insertion into a film-containing housing through a light-sealed slot therein. The unit comprises a carrier sheet sufficiently rigid to be pushed through the aperture without buckling and including (a) a tab portion adapted to be gripped manually during insertion of the unit and (b) an insert portion configured to fit through the aperture. A label is provided in the unit, and means are located on the label defining indicia. Securing means are included for affixing the label to the insert portion of the carrier sheet. Phosphorescent material is provided in the unit for emitting light away from the carrier sheet insert portion and silhouetting the indicia on the label.

Yet another aspect of the invention is a label assembly of laminar construction comprising a label ply and means thereon defining indicia. Adhesive means are included on the label ply for securing the assembly in a given position during use. Phosphorescent material is distributed in the assembly for emitting light which silhouettes the indicia during use.

Applied to X-ray photography in a large hospital, the invention provides marked advantages over the conventional film identification techniques discussed previously. The patient's name and other information is typed on the label and the label is adhered to the carrier sheet. This unit is simply inserted into the X-ray cassette, held there briefly so that afterglow from the phosphorescent material records the data on the film, and then withdrawn. This can be done with little effort by the radiologist at the time the X-ray is taken so that there is no delay during which confusion of identification cards can occur. Because the light output of the phosphorescent insertion unit is constant, and can be correlated to the sensitivity of the film, uniformly legible identifications are made on the film regardless of variations in the intensity of the X-rays.

Achievement of these and other significant objects will be evident in the following description of a preferred embodiment of the invention with reference to the accompanying drawings.

DESCRIPTION OF THE DRAWINGS

FIG. 1 is a perspective view, partly broken away, of an X-ray cassette adapted to the invention;

FIG. 2 is a perspective of the same cassette fully closed and illustrating the associated insertion unit;

FIG. 3 is an enlarged fragmentary section partly broken away of the cassette taken along the line 3—3 of FIG. 2;

FIG. 4 is a graph showing the relationship of light output from the insertion unit to film sensitivity against time;

FIG. 5 is a composite perspective showing the label and carrier sheet of one form of the insertion unit;

FIG. 6 is an enlarged fragmentary section of the insertion unit of FIG. 5;

FIG. 7 is a composite perspective showing the label and carrier sheet of another form of the insertion unit; and FIG. 8 is an enlarged fragmentary section of the insertion unit of FIG. 7.

Referring to FIGS. 1 to 3, a cassette 10 is shown which includes a lid 11, a channel frame 12, and a front panel 13. The lid, which is in the open position in FIG. 1 and closed in FIGS. 2 and 3, is hinged to the frame 12 and the front panel 13 is fixed in the frame 12, all in the conventional manner. Latches 14 on the frame 12 serve to releasably secure the lid 11 in closed position.

The customary interior elements of the cassette 10 include at least the following: Inside the lid 11 is a felt pressure pad 15 (lead foil may be disposed between them). On the interior side of the pad 15 is a rear intensifying screen 16 of fluorescent material, the function of which is to convert X-ray energy to visible light. Next is photographic X-ray film 17. Immediately on the other side of the film 17 is a front intensifying screen 18 similar in structure and function to the rear screen 16. Between the front intensifying screen 18 and the front panel 13 is another pressure pad 19.

In a typical cassette, the two intensifying screens and the film are removable while the pressure pads are adhered in place. When the lid 11 is closed the interior elements of the cassette are held tightly together due to the resiliency of the pads 15 and 19. The film 17 is thereby completely enclosed within a tight opaque housing.

In use the subject to be diagnosed is placed before the front panel 13 and X-rays are directed through the subject and into the cassette 10. When the X-rays strike the intensifying screens 16 and 18 they cause them to glow and that visible light in turn exposes the film 17. Those portions of the subject which are less permeable to X-rays cast what is in effect a shadow on the intensifying screens and the image of it is thereby recorded on the film.

The object of the present invention is to record on the film not only the image of the subject being diagnosed but also the image of the patient's name or other identifying data useful in interpreting the X-ray photograph.

For this purpose a light-sealed aperture is provided in the cassette to receive an insertion unit 21. The insertion unit 21 is generally illustrated in FIGS. 2 and 3 (specific forms are described in detail hereinafter). It includes a plastic carrier sheet 22 which is flexible but sufficiently rigid to be pushed into the cassette without buckling. The carrier sheet includes an insert portion 23 and a wider tab portion 24 so that its overall configuration is T-shaped A translucent label 25 is adhered to the insert portion 23 of the unit and indicia 26 setting forth the desired information are typed on the face of the label. Somewhere behind the typed indicia 26 the insertion unit includes phosphorescent material which is activated by incident radiation to emit light, and that light silhouettes the typed indicia 26.

In the lid 11 of the cassette a slot 28 is formed which angles inwardly as shown in FIG. 3. The pressure pad 15 inside the lid 11 is cut away as shown in FIGS. 1 aNd 3, and so also is the intensifying screen 16 on the interior surface of the pad 15. A resilient light-seal assembly 29 attached by rivets 30 occupies the cut out area of the pad 15. It is composed of two feltlike flaps 31 and 32 separated by a flexible tongue 33, all biased together by a leaf spring 34 so that the entire assembly presses resiliently toward an opposed bevelled surface 35 on the pad 15 to seal the interior of the cassette against entry of ambient light. These parts of the apparatus provide guiding means in the cassette for properly positioning the insertion unit 21.

To the other side of the front intensifying screen 18 from the light-seal assembly is a rectangular lead blocker 36 of approximately the same width as the cutout portion of the screen 16. As shown the blocker 36 is seated in the inner face of the front panel 13 and occupies a cutout area in the pressure pad 19. As an alternative, the screen 18 may be formed with a cutout area coincident with the area shown to be covered by the blocker 36, or an opaque layer may be deposited on the screen 18 in that area on the side thereof facing the film 17. If the X-ray intensity is relatively high, the blocker may be used together with a cutout in the screen 18. These represent several methods which may be used for preventing X-ray-activated illumination from exposing the film 17 in the region thereof coincident with the cutout area of the screen 16 to the right of the light-seal assembly 29 as seen in FIG. 3.

By this construction the insertion unit 21 can be gripped manually at its tab portion 24 and the insert portion 23 thereof can be directed through the slot 28 in the closed lid 11 of the cassette 10. The end of the insert portion 23 is thus forced past the flap 31 and bends around the beveled surface 35 on the pad 15 so that it can slide fully into the cutout area of the screen 16 along the rearward face of the film. The insertion unit is oriented during this procedure so that its label 25 will face forward in contact with the film 17 in the inserted position.

In the inserted position, the phosphorescent material incorporated in the insertion unit (in a manner described hereinafter) casts the silhouette of the indicia 26 on the surface of the film 17 in the rectangular area of the film 17 which is protected by the blocker 36 or other means and hence is otherwise unexposed. The afterglow from the insertion unit thereby exposes the image of the indicia on the film.

The phosphorescent material is preferably a phosphor such as copper-activated zinc sulfide. Its light output should be sufficiently limited so that it does not expose the film during the brief period the unit 21 is moving into position during insertion. The output of light should be great enough, however, so that during the hold period the film becomes legibly exposed with the image of the indicia Many phosphors can be matched with most X-ray films to achieve these objects. There is another characteristic of phosphors which can be selected to produce on of the most significant advantages of the invention, and that is the property of afterglow decay rate. After excitation by exposure to incident light, a phosphorescent material glows but at a diminishing level. After a short time it emits virtually no light at all.

FIG. 4 is a graph showing the cumulative light output of a representative phosphor plotted against time. It will be seen that during the brief period required for inserting the unit the light output is quite low (e.g. 0.4 seconds) and hence does not cause smearing of the film while the indicia are in motion. It is also apparent that the hold time (e.g. 4 or 5 seconds) for achieving proper exposure is relatively short. Finally the FIG. 4 graph shows the diminishing afterglow from the phosphor does not add significantly to the cumulative light output after the recommended hold period is complete, and hence no matter how long the unit is left in place it will not reach the overexposure level of the film. In practice this means that even though an insertion unit may be left inside a cassette too long by mistake, the film therewithin will still be legibly printed with the identifying data. Timely withdrawal after the specified hold period is not critical, and the chance of error in the identification process is greatly reduced.

A phosphor which exhibits a so-called "power law" or hyperbolic brightness decay rate is preferred for this purpose. In addition to copper-activated zinc sulfide, silver-activated zinc sulfide or zinc cadmium sulfide and copper-activated zinc cadmium sulfide also can be employed. By varying such properties as emission color, these phosphors may be adapted for use with film of different speed or sensitivity.

In the form of insertion unit shown in FIGS. 5 and 6, the carrier sheet 22A is of a plastic such as polytetrafluorethylene. While it is flexible, it has sufficient column strength to penetrate the light-sealed aperture of the cassette without buckling. A label 25A is employed which is of paper, plastic or other suitable material. Covering one surface of the label 25A is a layer 39 of uniformly dispersed fine crystals of a phosphor such as copper-activated zinc sulfide. Typed, printed or otherwise marked on the exposed face of the layer 39 is all the identifying data desired. This may include not only the patient's name and so on but also the time of the X-ray, an important item of information in many X-ray techniques where progressive change is to be observed. The label could be automatically stamped with the time by means of an appropriate clock-printer into which the radiologist may insert the unit.

On the surface of the label 25A opposite the phosphor layer 39 is a coating 40 of pressure-sensitive adhesive. The label 25A may advantageously be torn along perforation lines from a larger sheet containing many labels, and the coatings of pressure-sensitive adhesive and phosphor may cover the entire sheet. Prior to the use of the label 25A, its adhesive coating 40 is protected by a strip sheet 41 which can be discarded after it is removed.

In operation, the label 25A is typed or stamped directly on its phosphor layer 39 as desired, its strip sheet 41 is removed to expose the pressure sensitive adhesive 40 and it is then applied to the insert portion of the carrier sheet 22A. Just before or after the patient's X-ray is taken, the phosphor on the label is made to glow by exposure to incident radiation, which may be simply the ambient light in the room. The carrier sheet 22A is then thrust into the cassette 10 through the aperture 28 and held there for a count of 4 seconds. During this time the afterglow from the phosphor casts the silhouette of the indicia on the film 17, with little penumbra effect since the phosphor layer and indicia are in direct contact with one another and with the film. After this hold period the operator pulls out the insertion unit and identification is complete.

The unit can be used again for any number of additional X-rays the patient may have taken. (As the X-rays are taken, the area of the film reserved for the identification is isolated by the blocker 36 from any light emitted by the intensifying screens 16 and 18.) Before each insertion, proper charging of the phosphor by exposure to incident light should be insured. After the film in all the cassettes is marked, the label 25A is removed from the carrier sheet 22A and discarded.

In the form of insertion unit illustrated in FIGS. 7 and 8, a carrier sheet 22B is provided with a dry coating 45 of phosphor. A label 25B used therewith has only pressure-sensitive adhesive 46 disposed on the side opposite the indicia. To protect the adhesive prior to use a disposable strip sheet 47 is provided. This embodiment differs from that of FIGS. 5 and 6 in that the phosphor is on the carrier sheet rather than the label before the two are brought together. In the assembly there is less close spacing between the phosphor and the indicia than in the prior embodiment because here the adhesive and the label stock lie between. Hence, there is a theoretically greater chance of some slight fogging due to a larger penumbra.

Many variations can be made in the procedures and devices described above without departing from the essential concept of the invention. Rather than use a label, indicia could be placed directly on a phosphor-coated element similar to the carrier sheet 22B. It is conceivable to mix the phosphor with the adhesive or apply it as a coating on the carrier sheet, or the phosphor could be uniformly dispersed in the body of the carrier sheet or of the label, or the carrier sheet could be made translucent and the phosphor disposed on the side thereof opposite the label. Adhesive can be located on the carrier sheet rather than the label and it need not be pressure sensitive. It is also possible that the insertion unit be a shape other than flat, in order to be used with film-containing housings other than X-ray cassettes.

We claim:

1. In photographic apparatus including a housing adapted to be loaded with film and having a light-sealed aperture, and a film-marking unit insertable into the housing through the aperture which includes a light-emitting phosphorescent composition overlaid with identifying indicia, whereby when the housing is loaded with film and the unit is inserted through the aperture an image of the indicia is cast in silhouette on the film, said apparatus comprising a. guiding means constructed to guide the unit so that when the unit is inserted into the film-loaded housing through said aperture the film is immediately and directly exposed to any emitted light silhouetting the indicia and remains so exposed until the unit is withdrawn from its inserted position, b. said phosphorescent composition on the unit being selected so that it is energizable to emit visible light which decays in brightness from a maximum immediately after energization and said maximum brightness of light output of said phosphorescent composition being sufficient to insure formation of a latent image of said indicia on the film during the period of insertion of the unit, and c. said maximum brightness being such that overexposure and fogging of the film does not occur during the period the unit is moving into its inserted position.

2. Photographic apparatus according to claim 1 wherein the indicia are in face-to-face contact with the film when the unit is in the inserted position.

3. Photographic apparatus according to claim 2 wherein the housing is an X-ray cassette and the light-sealed aperture is a slot in the cassette, and means are provided to prevent X-rays from causing exposure of the film in the area thereof which is to receive the image of the indicia.

4. In photographic apparatus including a housing adapted to be loaded with film and having a light-sealed aperture, and a film-marking unit insertable into the housing through the aperture which includes a light-emitting phosphorescent composition overlaid with identifying indicia, whereby when the housing is loaded with film and the unit is inserted through the aperture an image of the indicia is case in silhouette on the film, said apparatus comprising a. guiding means constructed to guide the unit so that when the unit is inserted into the film-loaded housing through said aperture the film is immediately and directly exposed to any emitted light silhouetting the indicia and remains so exposed until the unit is withdrawn from its inserted position, b. said phosphorescent composition on the unit being selected so that it is energizable to emit visible light which decays at a preselected rate in brightness from a maximum immediately after energization and said maximum brightness of light output of said phosphorescent composition being sufficient to insure formation of a latent image of said indicia on the film during the period of insertion of the unit, and c. said maximum brightness and decay rate being such that overexposure and fogging of the film does not occur during the period the unit is moving into its inserted position and regardless of the elapsed time between insertion and withdrawal of the unit.

5. X-ray film identification means comprising a. a flat cassette formed with a light-sealed slot and adapted to be loaded with film;

b. a flat film-marking unit insertable into the cassette through the slot and including
   i. a light-emitting phosphorescent composition, and
   ii. identifying indicia overlaying the phosphorescent composition;

c. guiding means constructed to guide the unit so that when the unit is inserted into the film-loaded cassette through said slot the film is immediately and directly exposed to any emitted light silhouetting the indicia and remains so exposed until the unit is withdrawn from its inserted position;

d. means for preventing X-rays from causing exposure of the film in the area which receives the emitted light from the unit;

e. said phosphorescent composition on the unit being selected so that it is energizable to emit visible light which decays at a predetermined rate in brightness from a maximum immediately after energization and said maximum brightness of light output of said phosphorescent composition being sufficient to insure formation of a latent image of said indicia on the film during the period of insertion of the unit; and f. said maximum brightness and decay rate being such that overexposure and fogging of the film does not occur during the period the unit is moving into its inserted position and regardless of the elapsed time between insertion and withdrawal of the unit.

* * * * *

PO-1050
(5/69)

UNITED STATES PATENT OFFICE
CERTIFICATE OF CORRECTION

Patent No. 3,631,243          Dated December 28, 1971

Inventor(s) William H. Byler, Halsey L. Raffman and Frank Masi

It is certified that error appears in the above-identified patent and that said Letters Patent are hereby corrected as shown below:

In the Specification

Column 2, Line 16,

"with A label is provided in the unit, and means are located on the label defining portion" should be --which includes (a) a portion--

Column 3, Line 52

"Period" missing after "T-shaped"

Column 3, Line 61

"aNd" should be --and--

Column 4, Line 34

"Period" missing after "indicia"

Column 4, Line 38

"on" should be --one--

Signed and sealed this 4th day of July 1972.

(SEAL)
Attest:

EDWARD M. FLETCHER, JR.          ROBERT GOTTSCHALK
Attesting Officer                Commissioner of Patents